United States Patent
Lee

(10) Patent No.: US 9,706,244 B2
(45) Date of Patent: *Jul. 11, 2017

(54) USER TERMINAL APPARATUS, DISPLAY APPARATUS, USER INTERFACE PROVIDING METHOD AND CONTROLLING METHOD THEREOF

(71) Applicant: SAMSUNG ELECTRONICS CO., LTD., Gyeonggi-do (KR)

(72) Inventor: Doh-hyeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,326

(22) Filed: Oct. 6, 2014

(65) Prior Publication Data

US 2015/0026726 A1 Jan. 22, 2015

Related U.S. Application Data

(63) Continuation of application No. 13/244,494, filed on Sep. 25, 2011, now Pat. No. 9,432,717.

(30) Foreign Application Priority Data

Mar. 2, 2011 (KR) .............................. 2011-0018663

(51) Int. Cl.
*G06F 3/0481* (2013.01)
*H04N 21/422* (2011.01)
(Continued)

(52) U.S. Cl.
CPC ... *H04N 21/42209* (2013.01); *H04N 21/4126* (2013.01); *H04N 21/42222* (2013.01);
(Continued)

(58) Field of Classification Search
None
See application file for complete search history.

(56) References Cited

U.S. PATENT DOCUMENTS

2004/0183756 A1 9/2004 Freitas et al.
2007/0176820 A1 8/2007 Vidal
(Continued)

FOREIGN PATENT DOCUMENTS

EP 1503584 A2 2/2005
WO 2009038596 A1 3/2009

OTHER PUBLICATIONS

Communication dated Aug. 6, 2012 issued by the European Patent Office in counterpart European Patent Application No. 11192839.6.
(Continued)

*Primary Examiner* — Mahelet Shiberou
(74) *Attorney, Agent, or Firm* — Sughrue Mion, PLLC

(57) ABSTRACT

A user terminal apparatus is provided. The user terminal apparatus includes a communication interface unit which receives user interface (UI) information data regarding a UI screen corresponding to at least one application displayed on an external apparatus in communication with the external apparatus, a storage unit which stores a UI information conversion format, an information conversion unit which converts the received UI information data using the UI information conversion format, a display unit which displays a UI screen, and a control unit which controls the information conversion unit to convert the UI information data received by the communication interface unit using the UI information conversion format and display on the display unit the UI screen corresponding to the converted UI information data.

22 Claims, 27 Drawing Sheets

(51) Int. Cl.
  *H04N 21/41* (2011.01)
  *H04N 21/431* (2011.01)
  *H04N 21/8543* (2011.01)
  *H04N 21/81* (2011.01)

(52) U.S. Cl.
  CPC ..... *H04N 21/42224* (2013.01); *H04N 21/431* (2013.01); *H04N 21/8173* (2013.01); *H04N 21/8543* (2013.01)

(56) References Cited

U.S. PATENT DOCUMENTS

| | | |
|---|---|---|
| 2008/0284907 A1 | 11/2008 | Chiao |
| 2009/0156251 A1 | 6/2009 | Cannistraro et al. |
| 2009/0239587 A1* | 9/2009 | Negron ............... G06F 3/04883 455/566 |
| 2009/0307658 A1* | 12/2009 | Freitas et al. ................. 717/113 |
| 2010/0081375 A1* | 4/2010 | Rosenblatt et al. .......... 455/41.1 |
| 2010/0171636 A1* | 7/2010 | Lee et al. .................. 340/825.69 |
| 2010/0222102 A1 | 9/2010 | Rodriguez |
| 2011/0119707 A1* | 5/2011 | Bae .................... H04N 21/4622 725/39 |
| 2011/0231872 A1* | 9/2011 | Gharachorloo et al. ........ 725/28 |
| 2011/0286428 A1* | 11/2011 | Souissi ......................... 370/331 |

OTHER PUBLICATIONS

Communication dated Jan. 22, 2014, issued by the European Patent Office in counterpart European Application No. 11192839.6.
Communication dated Dec. 15, 2014 issued by European Patent Office in counterpart European Patent Application No. 11192839.6.
Communication dated May 18, 2015 issued by the European Patent Office in counterpart European Patent Application No. 15156632.0.
Communication dated Jun. 30, 2016 issued by European Patent Office in counterpart European Application No. 15 156 632.0.
Communication issued Dec. 29, 2016, issued by the Korean Intellectual Property Office in counterpart Korean Patent Application No. 10-2011-0018663.
Communication issued Mar. 6, 2017, issued by the European Patent Office in counterpart European Patent Application No. 15156632.0.

\* cited by examiner

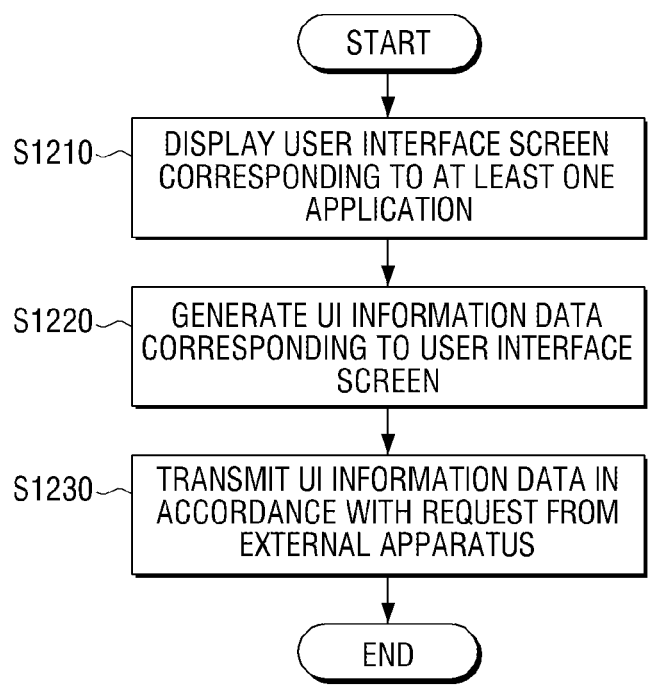

USER TERMINAL APPARATUS, DISPLAY APPARATUS, USER INTERFACE PROVIDING METHOD AND CONTROLLING METHOD THEREOF

CROSS-REFERENCE TO RELATED APPLICATION

This is a continuation of U.S. application Ser. No. 13/244,494, filed Sep. 25, 2011 which claims priority from Korean Patent Application No. 2011-0018663, filed in the Korean Intellectual Property Office on Mar. 2, 2011, the disclosure of which is incorporated herein by reference in their entirety.

BACKGROUND

1. Field

Methods and apparatuses consistent with exemplary embodiments relate to a user terminal apparatus, a display apparatus, a user interface (UI) providing method, and a controlling method thereof, and more particularly, to a user terminal apparatus providing a function of controlling an external apparatus, a display apparatus, a UI providing method and a controlling method thereof.

2. Description of the Related Art

Various electronic apparatuses including a display apparatus may be controlled by a remote controller.

With the development of functions of electronic apparatuses, the number of control items in such electronic apparatuses has also increased.

In particular, a television which receives a broadcast signal has various control modes as the number of channels increases due to the introduction of digital broadcasting and a plurality of external apparatuses are connected to the television. Accordingly, buttons in a remote controller have increased and become more complicated.

As control operations by a remote controller increase, a user may be provided with more interfaces. However, the increased and complicated controlling services provided by a display apparatus may create difficulties to the user. Specifically, a user may not use a remote controller conveniently and should perform more complicated key manipulation to use various services provided by a display apparatus.

Accordingly, a function of providing a user interface screen in more forms and in an intuitive way is required.

SUMMARY

One or more exemplary embodiments provide a user terminal apparatus providing an intuitive user interface screen corresponding to a currently executed application, a display apparatus, a UI providing method and a controlling method thereof.

According to an aspect of an exemplary embodiment, there is provided a user terminal apparatus including a communication interface unit which receives UI information data regarding a user interface screen corresponding to at least one application displayed on an external apparatus in communication with the external apparatus, a storage unit which stores a predetermined UI information conversion format, an information conversion unit which converts the received UI information data using the predetermined UI information conversion format, a display unit which displays a user interface screen, and a control unit which, if the UI information data is received, controls to convert the received UI information data using the UI information conversion format and display a user interface screen corresponding to the converted UI information data.

The user terminal apparatus may further include a user interface unit which receives a user command, and the control unit may control to execute a remote controller application in accordance with the user command, search a connectable external apparatus, and display an icon corresponding to at least one searched external apparatus.

The control unit may control to receive UI information data from an external apparatus corresponding to a selected icon from among icons corresponding to the external apparatus.

The control unit which, if there is a predetermined event, may control to convert UI information data corresponding to the predetermined event using the predetermined UI information conversion format and transmit the converted UI information data to the external apparatus.

The user terminal apparatus may further include a movement sensing unit which senses a movement of the user terminal apparatus, and the control unit which, if there is a movement of the user terminal apparatus after a predetermined event occurs, may control an operation state of the external apparatus in accordance with a degree of a movement sensed by the gradient sensing unit.

The display unit may be embodied as a touch screen, and the predetermined event may be a touch event by a user.

A display apparatus, according to another exemplary embodiment, includes a communication interface unit which communicates with an external apparatus, a display unit which displays a user interface screen corresponding to at least one application, an information generating unit which generates UI information data corresponding to the user interface screen, and a control unit which controls the communication interface unit to transmit the UI information data to the external apparatus in accordance with a request from the external apparatus.

The information generating unit may generate the UI information data in a form of an extensible markup language (XML) document.

The information generating unit may be embodied as an application.

The control unit, if UI information data is received from the external apparatus, may perform a control operation corresponding to the received UI information data.

According to an aspect of another exemplary embodiment, there is provided a method for providing a UI of a user terminal apparatus, the method including receiving UI information data regarding a user interface screen corresponding to at least one application displayed on an external apparatus in communication with the external apparatus, converting the received UI information data using the predetermined UI information conversion format, and displaying a user interface screen corresponding to the converted UI information data.

The method may further include receiving a user command and executing a remote controller application in accordance with the user command, searching a connectable external apparatus, and displaying an icon corresponding to at least one searched external apparatus.

The method may further include receiving UI information data from an external apparatus corresponding to a selected icon from among icons corresponding to the external apparatus.

The method may further include, if there is a predetermined event, converting UI information data corresponding to the predetermined event using the predetermined UI information conversion format and transmitting the converted UI information data to the external apparatus.

The method may further include, if there is a movement of the user terminal apparatus after a predetermined event occurs, controlling an operation state of the external apparatus in accordance with a degree of sensed movement.

The display unit may be embodied as a touch screen, and the predetermined event may be a touch event by a user.

According to an aspect of another exemplary embodiment, there is provided a method for controlling a display apparatus, the method including displaying a user interface screen corresponding to at least one application, generating UI information data corresponding to the user interface screen, and transmitting the UI information data to an external apparatus in accordance with a request from the external apparatus.

The generating may include generating the UI information data in a form of an XML document.

The generating may be performed in the application.

The method may further include, if UI information data is received from the external apparatus, performing a control operation corresponding to the received UI information data.

BRIEF DESCRIPTION OF THE DRAWINGS

The above and/or other aspects of the present disclosure will be more apparent by describing certain exemplary embodiments with reference to the accompanying drawings, in which:

FIG. 12 is a flowchart to explain a method for controlling a display apparatus according to an exemplary embodiment.

DETAILED DESCRIPTION

Figure 1:
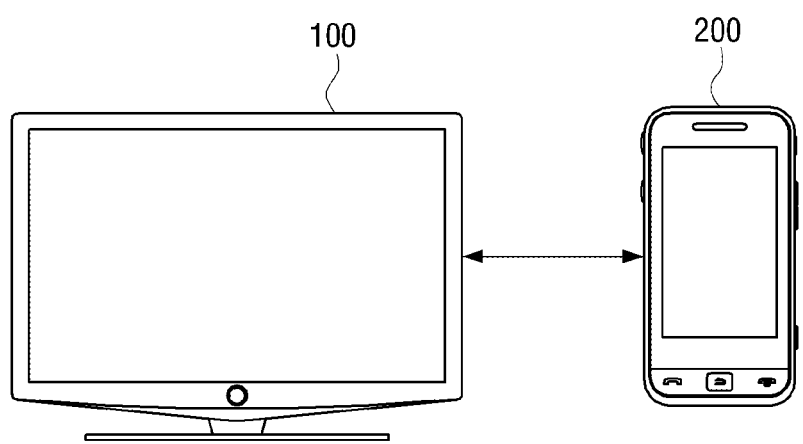
FIG. 1 is a view to explain a display system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view to explain a display system according to an exemplary embodiment.

According to FIG. 1, the display system according to an exemplary embodiment comprises a display apparatus 100 and a user terminal apparatus or a mobile apparatus 200.

The display apparatus 100 according to an exemplary embodiment may be configured in various ways. The display apparatus 100 may be mainly embodied as a smart television (TV), and in some cases, as a desktop computer, a notebook computer, a digital broadcast terminal, or a navigation. In this exemplary embodiment, it is assumed that the display apparatus 100 is a smart TV for convenience of explanation.

The display apparatus 100 may be configured to receive various control commands from the mobile apparatus 200 in communication with the mobile apparatus 200. That is, the mobile apparatus 200 may function as a remote controller controlling the display apparatus 100.

In particular, the display apparatus 100 may operate at least one application on its own and display a user interface screen corresponding to the operated application.

The user terminal apparatus 200 may be configured to operate and execute its own various applications. For example, the user terminal apparatus 200 may be embodied as a smart phone, and depending on cases, the user terminal apparatus 200 may be any apparatus which can operate an application on its own such as a Personal Digital Assistant (PDA) and a Portable Multimedia Player (PMP).

In particular, the user terminal apparatus 200 may operate an application (hereinafter, a remote application) which performs a function of a remote controller to control the external display apparatus 100. Alternatively, the function of a remote controller to control the external display apparatus 100 may be provided through a separate control mode instead of a certain application.

Herein, the user terminal apparatus 200 may receive and transmit data in communication with the display apparatus 100 via a network. Specifically, the user terminal apparatus 200 may communicate with the display apparatus 100 according to various wired/wireless communication technologies such as Wireless Fidelity (WI-FI), Internet, local area network (LAN), Ethernet, TCP/IP, IPX, FireWire, IEEE 1394, iLink, CDMA, TDMA, BlueTooth (BT), High Definition Multimedia Interface (HDMI-CEC), Wireless HDMI-CEC, Radio Frequency (RF), and etc.

For example, if the user terminal apparatus 200 and the display apparatus 100 are connected to the same sharer, a remote controller function may be performed with regard to the display apparatus 100 as the display apparatus 100 is searched according to a user's command or a predetermined event and thus, the display apparatus 100 is connected.

Hereinafter, configuration of a display apparatus according to an exemplary embodiment will be explained in detail.

Figure 2:
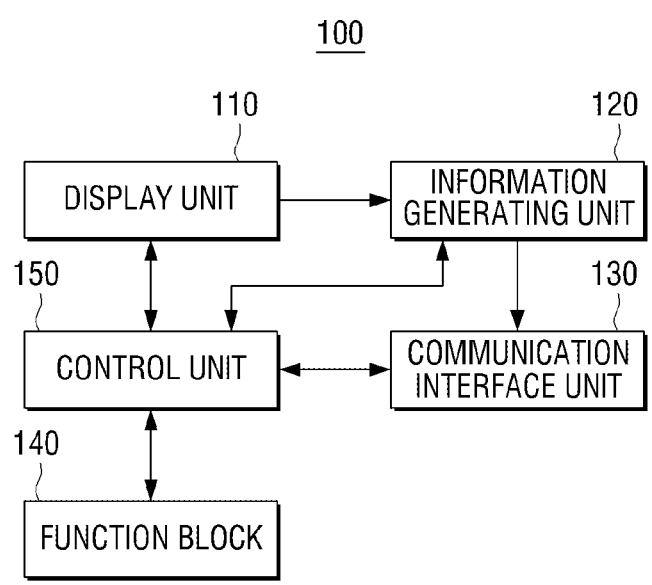
FIG. 2 is a block diagram illustrating configuration of a display apparatus according to an exemplary embodiment.

FIG. 2 is a block diagram illustrating configuration of a display apparatus according to an exemplary embodiment.

According to FIG. 2, the display apparatus 100 comprises a display unit 110, an information generating unit 120, a communication interface unit 130, a function block 140, and a control unit 150.

As illustrated above with regard to FIG. 1, the display apparatus 100 may be configured to operate at least one application on its own. Accordingly, the display apparatus 100 may be mainly embodied as a smart TV, but is not limited thereto.

The display unit 110 may display a user interface screen corresponding to at least one application. Herein, the display unit 110 may be embodied as at least one of a liquid crystal display, a thin film transistor-liquid crystal display, an organic light-emitting diode, a flexible display, and a 3D display, but is not limited thereto.

The information generating unit 120 generates UI information data corresponding to a user interface screen displayed on the display unit 110.

Specifically, the information generating unit 120 may generate UI information data in the form of an XML document. Herein, the UI information data may include contents for composing UI and also contents of UI. The specific form of an XML document will be explained in detailed with reference to a drawing.

Meanwhile, the function of the information generating unit 120 may be configured to be performed by a specific application. That is, UI information data corresponding to a user interface screen which is currently displayed on a specific application may be generated. Alternatively, UI information data corresponding to a user interface screen displayed on the display unit 110 in a currently-operated application may be generated.

The communication interface unit 130 performs communication with an external apparatus (FIG. 1, 200). Herein, the external apparatus (FIG. 1, 200) may be embodied as a mobile apparatus such as a smart phone, but is not limited thereto.

The function block 140 performs an original function of the display apparatus 100. If the display apparatus 100 is a smart TV, the function block 140 performs a function of a smart TV, and if the display apparatus 100 is a navigation, the function block performs a function of a navigation guiding a path.

The control unit 150 controls overall function of the display apparatus 100.

In particular, the control unit 150 controls the communication interface unit 130 to transmit UI information data generated by the information generating unit 120 according to a request from the external apparatus (FIG. 1, 200) to the external apparatus (FIG. 1, 200).

In addition, the control unit 150 may control a storage unit (not shown) to temporarily store UI information data generated by the information generating unit 120 in the storage unit (not shown) and transmit the UI information data to the external apparatus (FIG. 1, 200) upon a request from the external apparatus (FIG. 1, 200).

If UI information data is received from the external apparatus (FIG. 1, 200), the control unit 150 may also perform a control operation corresponding to the received UI information data. Specifically, the control unit 150 may check availability of the received UI information data and transmit the received UI information data to a corresponding block (for example, a corresponding application) so that the corresponding block can analyze the data and performs an appropriate function operation accordingly. The control unit 150 may generate a corresponding GUI if necessary.

Furthermore, the control unit 140 may control an operation of a UI processing unit (not shown) which will be explained later.

The UI processing unit (not shown) performs the operation of processing/generating various UI images in the form of two-dimensional (2D) or three-dimensional (3D) images. Herein, the UI images may be images for executing at least one application as described above. Alternatively, the UI images may be images displaying texts or figures such as menu, warning, time, channel number, and etc.

In addition, the UI processing unit (not shown) may perform 2D/3D conversion, adjustment of transparency, color, size, shape, and location, creating highlight or animation effect, and etc under the control of the control unit 150.

The storage unit (not shown) is a storage medium which stores various programs needed to operate the display apparatus 100 and may be embodied as a memory or a Hard Disk Drive (HDD). For example, the storage unit may include a read-only memory (ROM) for storing programs needed to operate the controlling unit 150 and a random access memory (RAM) for temporarily storing data regarding the operation of the controlling unit 150. In addition, the storage unit may further include an Electrically Erasable and Programmable ROM (EEROM) for storing various reference data.

In addition, the display apparatus 100 may further include an image receiving unit (not shown) which receives a 2D or 3D image signal transmitted wirelessly or via cables from a broadcasting station or a satellite and demodulates the received image signal and an image processing unit (not shown) which performs operations of processing signals such as video decoding, format analyzing, and video scaling and adding GUIs with respect to the received 2D or 3D image.

Hereinafter, the configuration of a user terminal apparatus according to an exemplary embodiment will be explained in detail.

Figure 3:
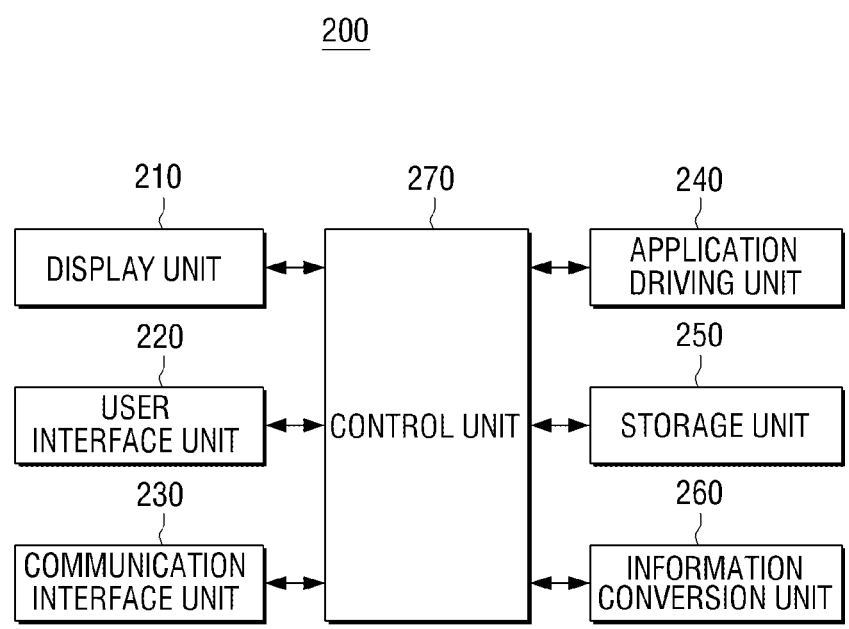
FIG. 3 is a block diagram illustrating configuration of a user terminal apparatus according to an exemplary embodiment.

FIG. 3 is a block diagram illustrating the configuration of a user terminal apparatus according to an exemplary embodiment.

According to FIG. 3, the user terminal apparatus 200 comprises a display unit 210, a user interface unit 220, a communication interface unit 230, an application driving unit 240, a storage unit 250, and a control unit 260.

The user terminal apparatus 200 may be configured to operate and execute various applications. For example, the user terminal apparatus 200 may be embodied as a smart phone, but is not limited thereto.

In particular, the user terminal apparatus 200 may operate an application (hereinafter, a remote application) which performs a function of a remote controller to control the external display apparatus 100. Alternatively, the function of a remote controller to control the external display apparatus 100 may be provided through a separate control mode instead of a certain application.

Herein, the user terminal apparatus 200 may transmit/receive various data in communication with the display apparatus 100 via network. For example, the user terminal apparatus 200 may communicate with Wireless Fidelity (WI-FI), but the method of communication is not limited thereto.

The display unit 210 displays various screens provided by the user terminal apparatus 200. Specifically, the display unit 210 may display various data subjects and various user interface screens from the user terminal apparatus 200.

In particular, the display unit 210 may display a user interface screen corresponding to an application for controlling the display apparatus 100 according to a predetermined event or a user command.

Herein, the display unit 210 may be embodied as at least one of a liquid crystal display, a thin film transistor-liquid crystal display, an organic light-emitting diode, a flexible display, and a 3D display.

Specifically, the display unit 210 may be embodied as a touch screen forming an interactive layer structure with a touch pad. In this case, the display unit 140 may be used as the user interface unit 220 which will be explained later. In addition, the touch screen may be configured to detect not only the location and size of an input but also the pressure of the input.

The user interface unit 220 receives a user command to select and control the above-mentioned control mode and application mode. Herein, the user interface unit 220 may be embodied as a touch screen integrally formed with the display unit 210 as described above.

The communication interface unit 230 communicates with the display apparatus 100.

Specifically, the communication interface unit 230 may receive UI information data regarding a user interface screen corresponding to at least one application displayed on a display screen of the display apparatus 100 from the display apparatus 100. For example, the communication interface unit 230 may receive UI information data from the display apparatus 100 via a network. Herein, the network may be embodied using various communication technologies such as Internet, LAN, WI-FI, Ethernet, TCP/IP, IPX, FireWire, IEEE 1394, iLink, CDMA, TDMA, BlueTooth (BT), High Definition Multimedia Interface (HDMI-CEC), Wireless HDMI-CEC, Radio Frequency (RF), and etc.

In addition, the communication interface unit 230 transmits data corresponding to a user command or a predetermined event input through the user interface unit 230 to the user terminal apparatus 100.

The communication interface unit 230 may also offer a path through which various application programs provided by the user terminal apparatus 200 are downloaded.

A communication method that the user terminal apparatus 200 uses to communicate with the display apparatus 100 may be the same as or different from a communication method that the user terminal apparatus 200 uses to download an application.

The application driving unit 240 drives and executes an application provided by the user terminal apparatus 200. Herein, the application represents a self-executable application program and may include various multimedia contents. Herein, the term of 'multimedia contents' includes text, audio, still image, animation, video, interactive content, Electronic Program Guide (EPG) content received from a content provider, an electronic message received from users, information regarding a current event, and control content, but are not limited thereto.

In particular, an application which is operated and executed in the application driving unit 240 may include a remote application for controlling an external apparatus. For example, a remote application for displaying a user interface screen to control the display apparatus 100 may be included. In this case, the user interface screen may display a user interface screen which is the same as or similar to the user interface screen displayed on the display apparatus 100.

The storage unit 250 stores various programs needed to operate the user terminal apparatus 200 and may be embodied as a memory or an HDD. For example, the storage unit 250 may include a ROM for storing programs needed to operate the controlling unit 260 and a RAM for temporarily storing data regarding the operation of the controlling unit 260. In addition, the storage unit 250 may further include an EEPROM for storing various reference data.

The storage unit 250 may store a predetermined UI information conversion format or a down-loaded application.

Herein, the predetermined UI information conversion format may represent a format into which UI information data transmitted from the display apparatus 100 is converted to correspond to the display format of the user terminal apparatus 200.

That is, the storage unit 250 may store a conversion format into which various UI information data transmitted from various display apparatuses 100 supported by the user terminal apparatus 200 is converted to correspond to the display format of the user terminal apparatus 200.

In addition, the storage unit 250 may store identification information, state information of each operation, and information of control screen corresponding to each operation state of the display apparatus 100 to be controlled, and provide a control screen corresponding to a state of the display apparatus 100 based on the stored information.

The information conversion unit 260 converts UI information data received through the communication interface unit 230 using a predetermined UI information conversion format stored in the storage unit 250.

Specifically, the information conversion unit 260 converts UI information data received through the communication interface unit 230 using a predetermined UI information conversion format so that the received UI information data may comply with the display format of the user terminal apparatus 200.

The control unit 270 controls overall operation of the user terminal apparatus 200.

In particular, if UI information data is received from the display apparatus 100, the control unit 270 may control the information conversion unit 260 to convert the received UI information data using a predetermined UI information conversion format stored in the storage unit 250 and display a user interface screen corresponding to the converted UI information data.

In addition, the control unit 270 may control the user interface unit 220 to execute a remote controller application according to a user command input through the user interface unit 220, searches a connectable external apparatus, and display an icon corresponding to at least one searched external apparatus on the display unit 210.

The control unit 270 may also control the communication interface unit 230 to receive UI information data from an external apparatus corresponding to a selected icon from among icons corresponding to external apparatuses displayed on the display unit 210.

If there is a predetermined event (or a user command), the control unit 270 may control to convert UI information data corresponding to the predetermined event (or the user command) using a predetermined UI information conversion format and transmit the converted UI information data to an external apparatus.

In addition, the control unit 270 may control an operation of a UI processing unit (not shown) which will be explained later.

The UI processing unit (not shown) performs the operation of processing/generating various UI images in the form of 2D or 3D images. Herein, the UI images may be images for executing at least one application as described above. Alternatively, the UI images may be images displaying texts or figures such as menu, warning, time, channel number, and etc.

In addition, the UI processing unit (not shown) may perform 2D/3D conversion, adjustment of transparency, color, size, shape, and location, creating highlight or animation effect, etc., under the control of the control unit 150.

Albeit not shown in the drawing, the user terminal apparatus 200 may further include a movement or gradient sensing unit (not shown).

The movement sensing unit (not shown) senses a movement of the user terminal apparatus 200. Herein, the movement may be a movement in up and down/right and left directions.

In this case, if there is a movement of the user terminal apparatus 200 after a predetermined event occurs, the control unit 270 may control an operation state of the display apparatus 100 according to a degree of the movement sensed by the gradient sensing unit (not shown). Herein, the predetermined event may be a touch event by a user, but is not limited thereto.

An operation state of channel up/down or volume up/down in the display apparatus 100 may be controlled according to a movement of a user terminal apparatus, but is not limited thereto.

Meanwhile, if a remote controller operation with respect to the display apparatus 100 is performed in accordance with execution of a remote application, the control unit 270 may control to execute other applications being executed previously in a background mode. For example, if a remote controller operation with respect to the display apparatus 100 is performed as a remote application is executed while a game application is being executed, the game application is executed in a background mode and may return to a previous state if the execution of the remote application is completed.

The user terminal apparatus 200 may include an exclusive button unit (not shown) indicating that a remote controller function is being executed. In some cases, the exclusive button unit (not shown) may function as a mode conversion button unit serving as a remote controller. That is, the functions of a remote controller may be performed not only by a corresponding remote application but also by the exclusive button unit (not shown) which is provided separately.

Herein, if the exclusive button unit (not shown) is embodied in the form of a soft button, the exclusive button unit may be embodied as a part of user interface unit (220) in the form of touch screen as described above.

In addition, the exclusive button unit (not shown) may be embodied in the form of a hard button, and in this case, the exclusive button unit may be provided in a separate area from the user interface unit 220.

Meanwhile, the user terminal apparatus 200 may receive various applications not only from a network as described but also from an external memory (not shown) or an internal memory (not shown). The internal memory (not shown) may include a computer memory such as a RAM, a flash memory, and a ROM, but is not limited thereto. Likewise, the external memory (not shown) may include an HDD, a Compact Disc (CD) ROM, a memory card, and a Universal Serial Bus (USB) flash drive, but is not limited thereto.

Figure 4A:
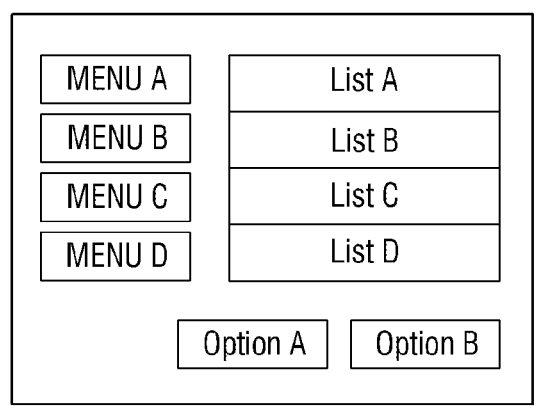
FIGS. 4A and 4B are views to explain a conversion form of a user interface screen according to an exemplary embodiment.
Figure 4B:
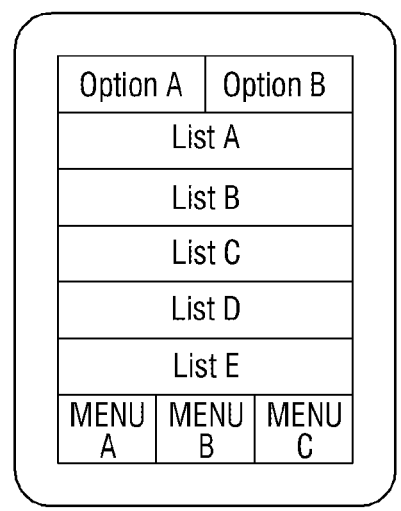

FIGS. 4A and 4B are views to explain a conversion form of a user interface screen according to an exemplary embodiment.

FIG. 4A illustrates a user interface screen displayed on the display apparatus 100, and FIG. 4B illustrates a user interface screen displayed on the user terminal apparatus 200.

That is, as illustrated in FIG. 4A, the user interface screen displayed on the display apparatus 100 may be displayed on the user terminal apparatus 200 through the above-described data format conversion operation as illustrated in FIG. 4B.

FIGS. 5A to 5E are views to explain a user interface screen according to various exemplary embodiments.

As illustrated in FIGS. 5A to 5D, if a remote controller function is executed, the user terminal apparatus 200 may provide various user interface screens including a channel/volume manipulation screen (FIG. 5A), a number input screen (FIG. 5B), a mecha-key input screen (FIG. 5C), a hot-key providing screen (FIG. 5D), and etc.

Figure 5A:
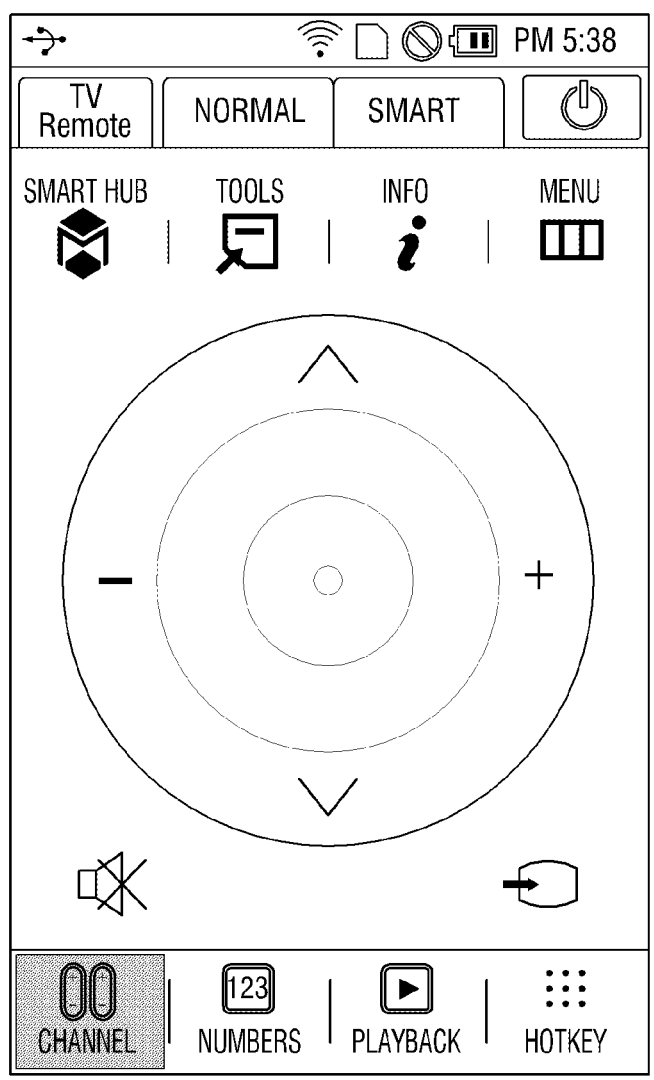
FIGS. 5A to 10B are views to explain a user interface screen according to various exemplary embodiments.
Figure 5B:
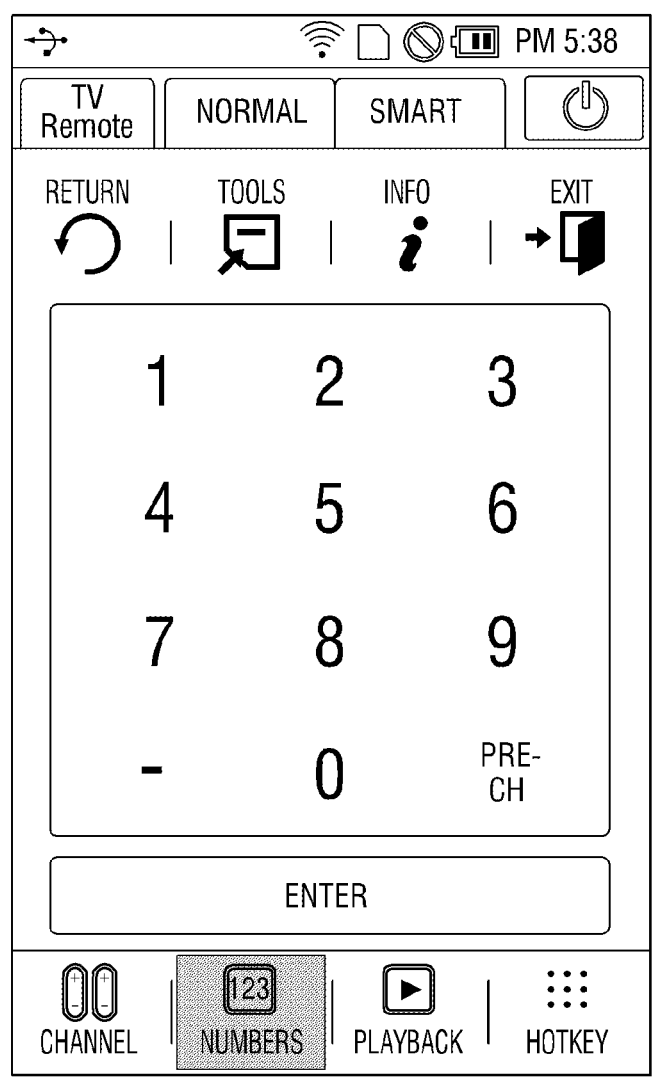
Figure 5C:
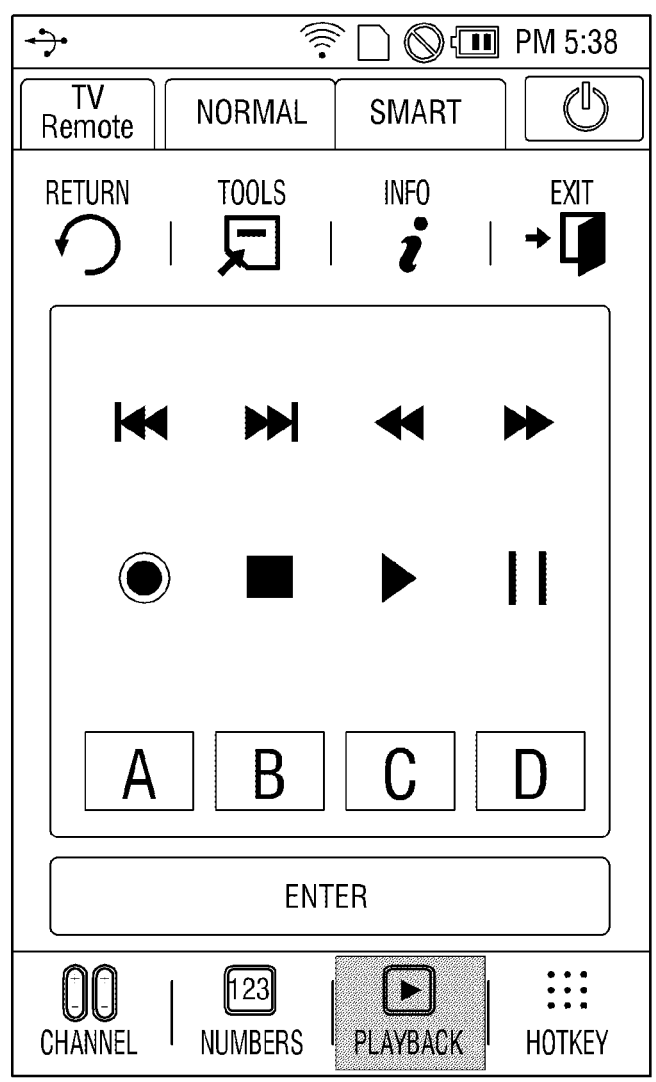
Figure 5D:
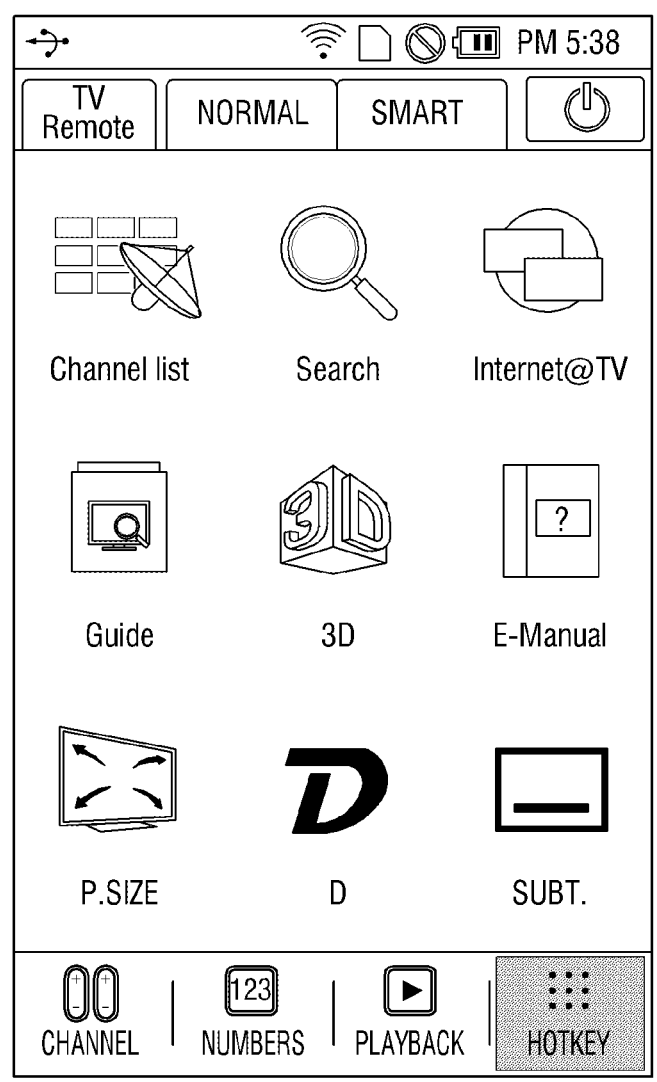
Figure 5E:
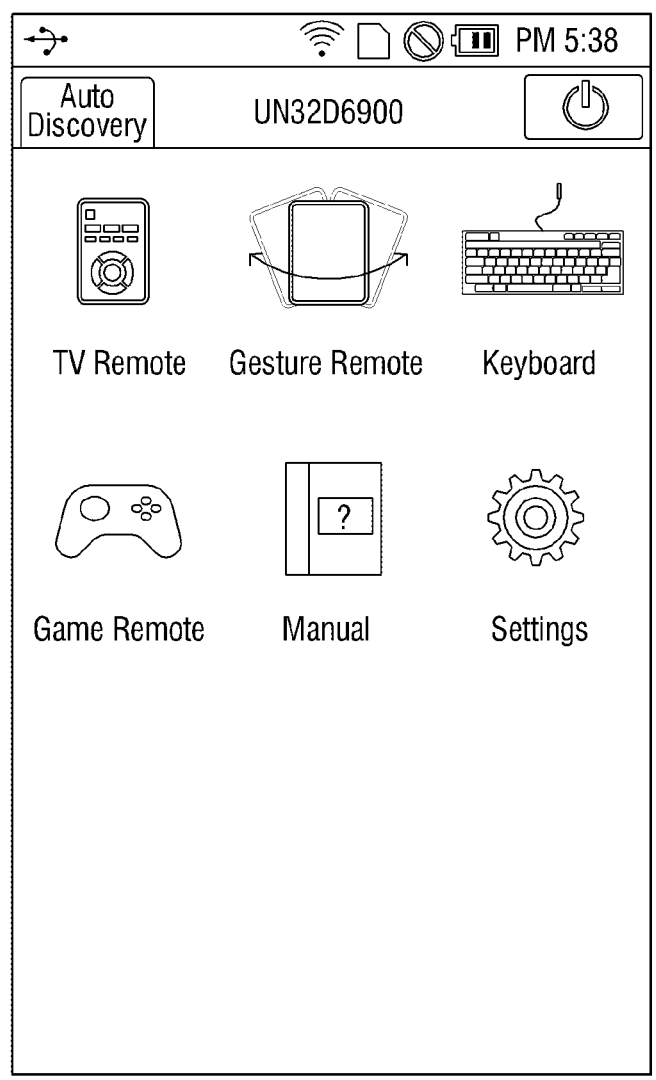

According to FIG. 5E, if a remote controller function is executed through a remote application, the user terminal apparatus 200 may display icons corresponding to a menu providing various functions.

The menu of "TV Remote" may be a menu for providing a user interface screen corresponding to an application displayed on the display apparatus 100.

The menu of "Gesture Remote" may be a menu for manipulating channel/volume of the display apparatus 100 after touching and tilting a screen.

The menu of "Keyboard" may be a menu for inputting a text when it is necessary to input a text in the display apparatus 100.

The menu of "Game Remote" may be a menu for providing an internet game using the display apparatus 100.

The menu of "Manual" may be a menu for providing description regarding basic function and usage of a remote application for performing a remote controller function.

The menu of "Setting" may be a menu for providing setting functions needed to use a remote application for performing a remote controller function.

FIGS. 6A to 6E are views to explain operations of a remote application according to an exemplary embodiment.

Figure 6A:
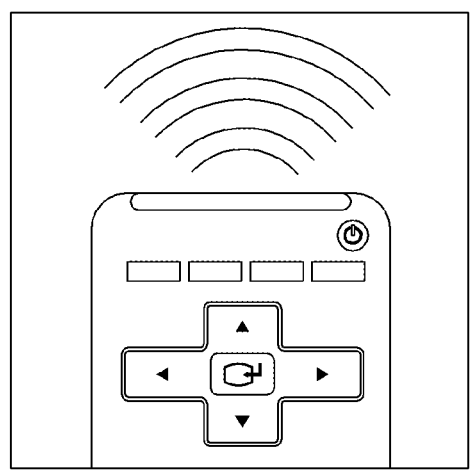
Figure 6B:
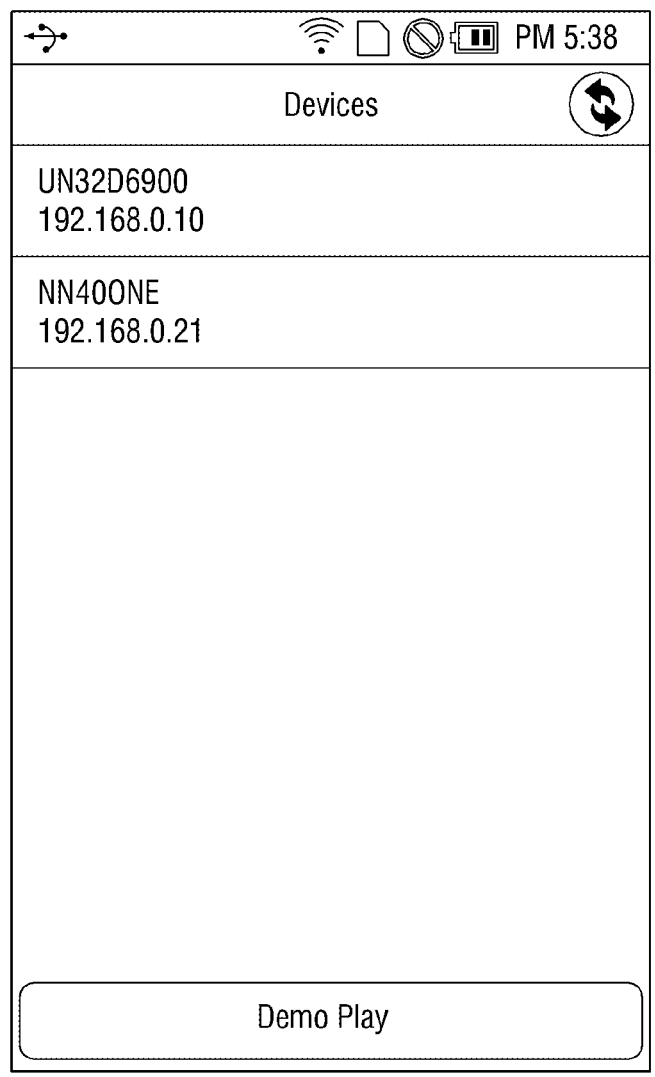

As illustrated in FIG. 6A, if a remote application is executed in the user terminal apparatus 200, a display apparatus connected to the same access point (AP) may be searched as illustrated in FIG. 6B.

Figure 6C:
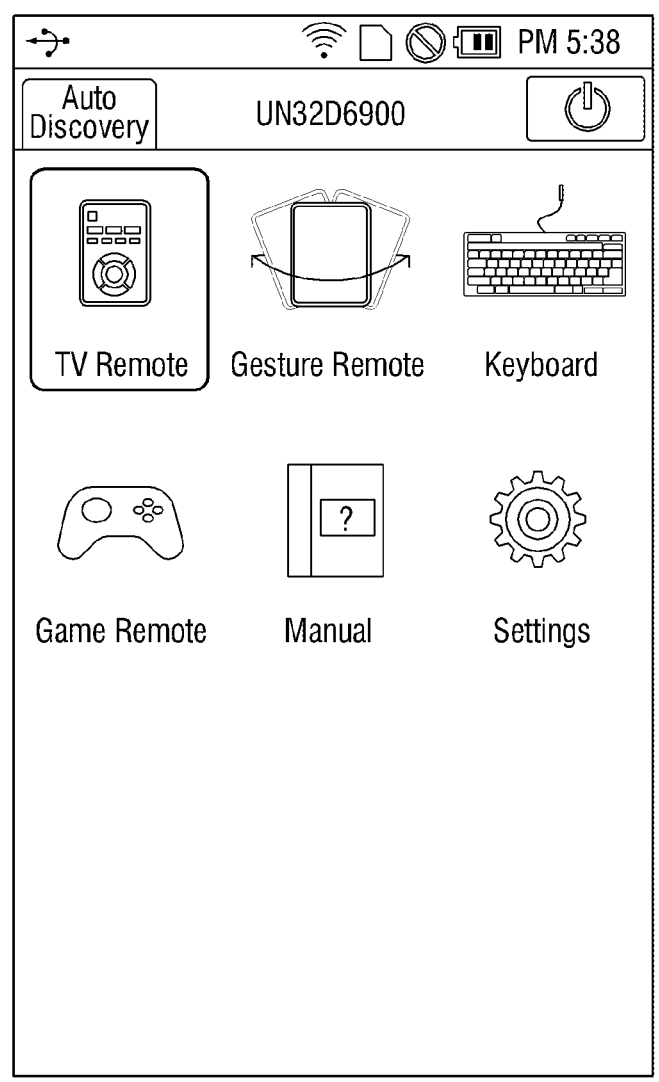

FIG. 6C may be a main screen when a selected display apparatus is connected and enters into the AP for the first time. As illustrated in FIG. 6C, the main screen may be the same screen as the one illustrated in FIG. 5E. Since each menu has been explained in detail with regard to FIG. 5E, further description will not be provided.

Figure 6D:
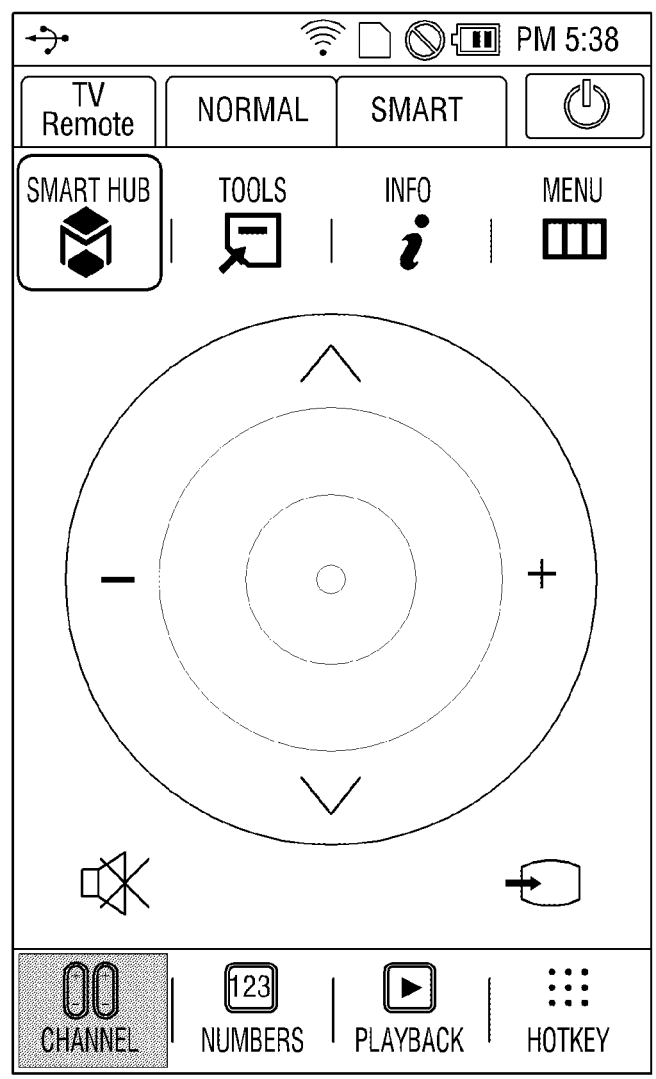

FIG. 6D may be a basic control screen which is provided when "TV Remote" menu is selected.

Figure 6E:
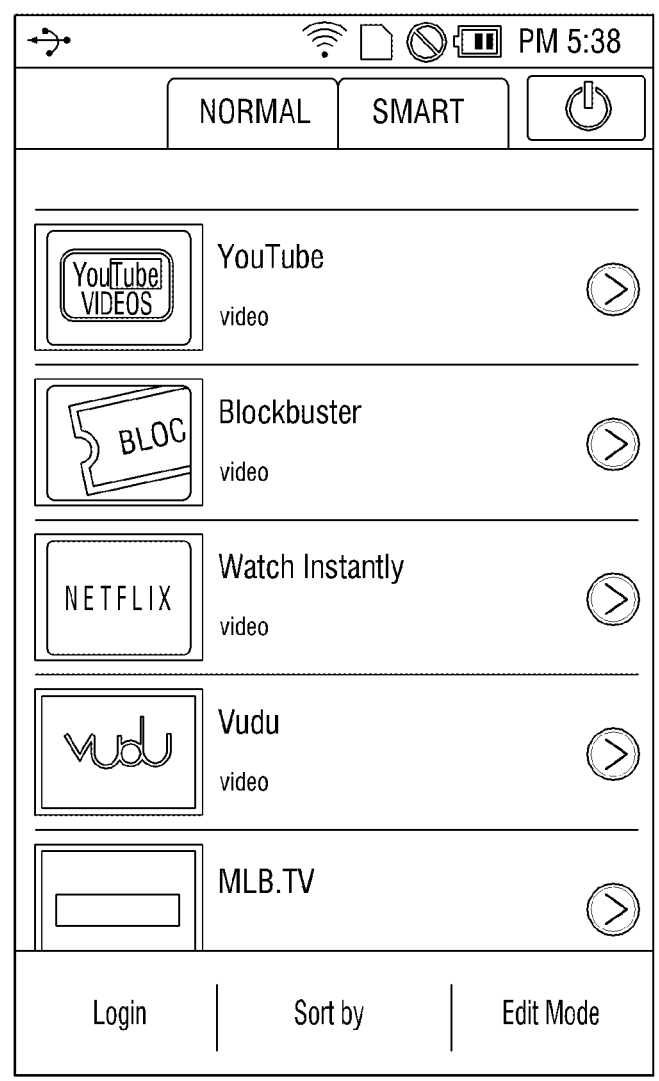

FIG. 6E may be a screen which is displayed for the first time when an application-exclusive menu ("SMART HUB") is entered into in a screen illustrated in FIG. 6D. As illustrated in FIG. 6E, a screen for manipulating various applications provided by the display apparatus 100 may be displayed on a screen of the user terminal apparatus 200.

FIGS. 7A to 7D are views illustrating various user interface screens provided by an application-exclusive menu according to an exemplary embodiment.

Figure 7A:
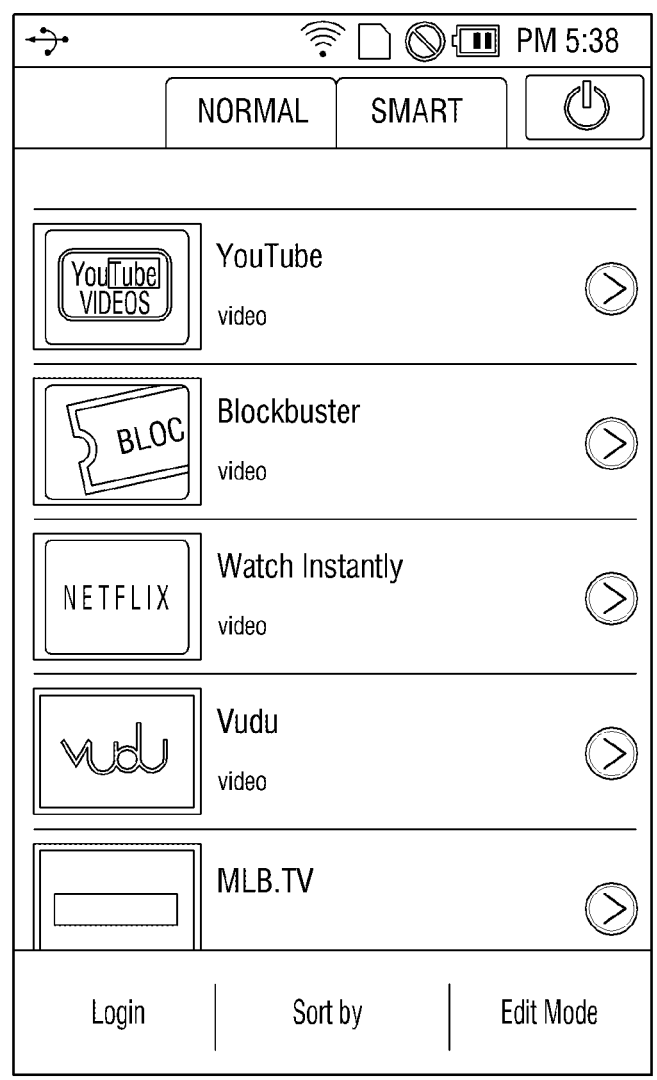

As illustrated in FIG. 7A, a main screen of an application-exclusive menu may be a screen which displays various applications provided by the display apparatus 100 in a list.

Figure 7B:
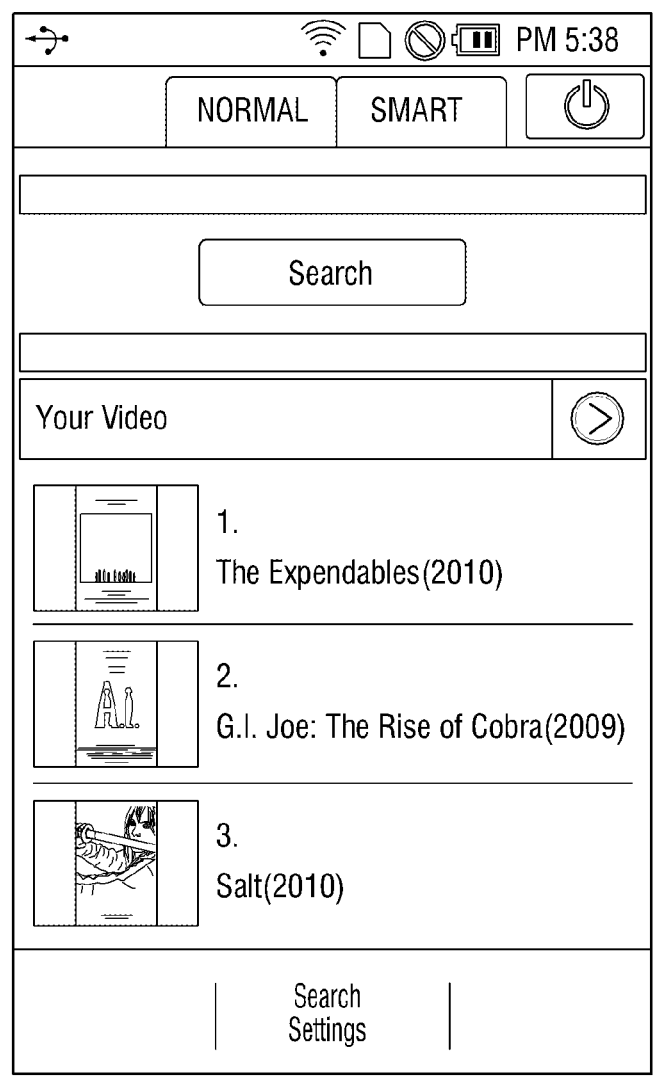

FIG. 7B illustrates a user interface screen when a "search" widget is executed.

Figure 7C:
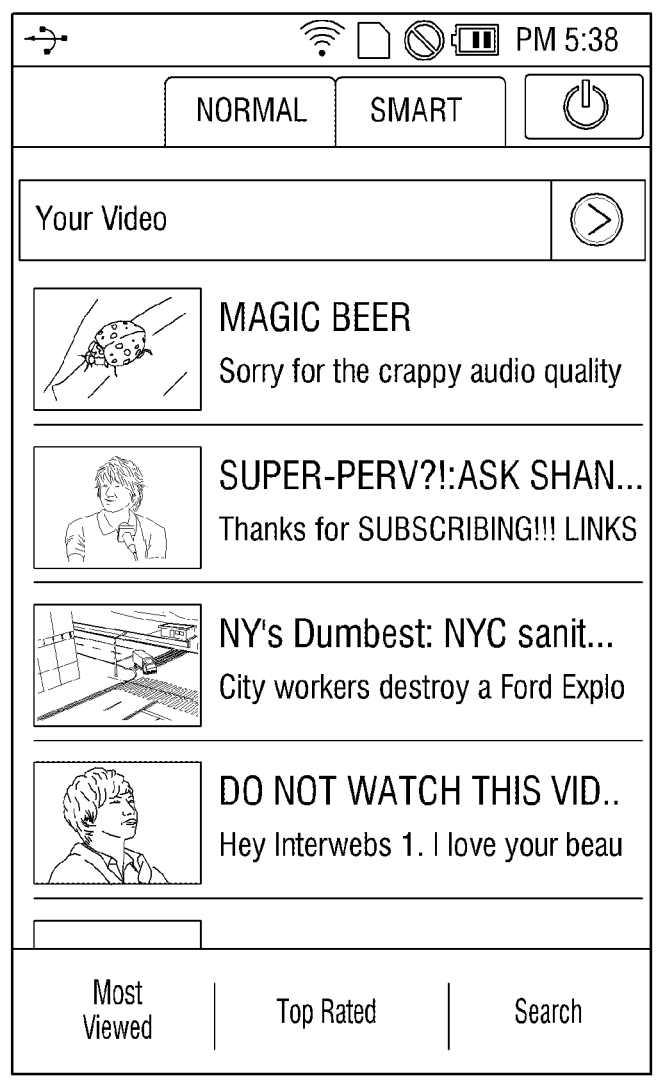

FIG. 7C illustrates an example of a detailed user interface screen when a specific application (for example, YouTube) is executed.

As illustrated in FIG. 7C, navigation among a plurality of contents provided by a specific application through a provided user interface screen are possible.

Figure 7D:

FIG. 7D illustrates an example of a user interface screen when a content is selected after a specific application (for example, YouTube) is executed.

As illustrated in FIG. 7D, manipulation of a content becomes easier using a provided user interface screen.

Meanwhile, as illustrated in FIGS. 7A to 7E, the above-described exclusive button unit may be activated if an application-exclusive menu is provided.

Figure 8A:
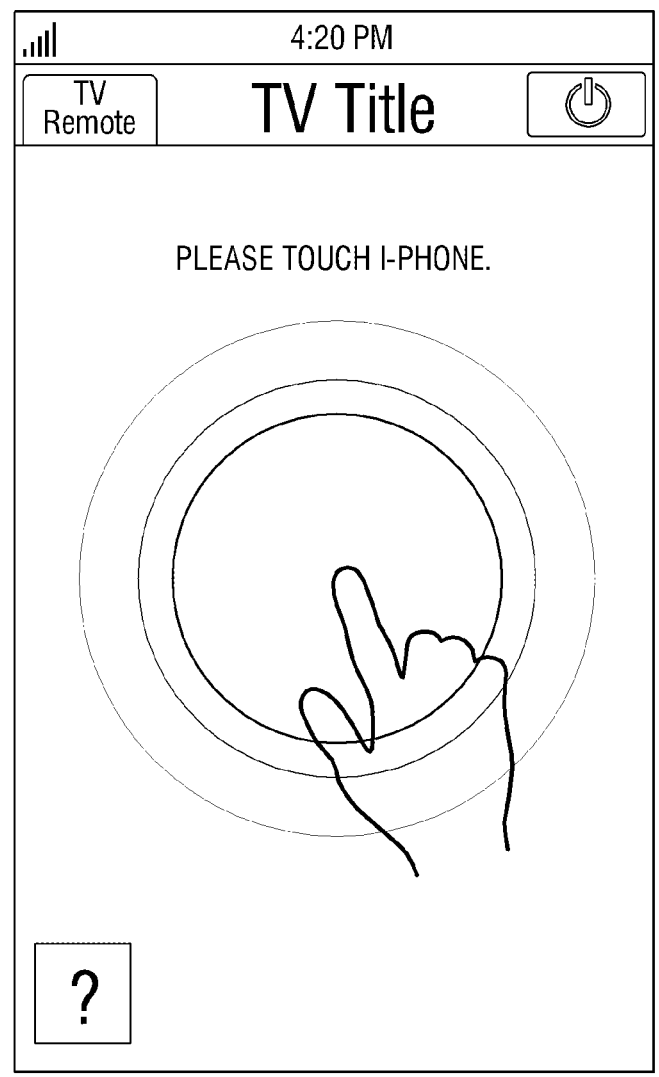
Figure 8B:
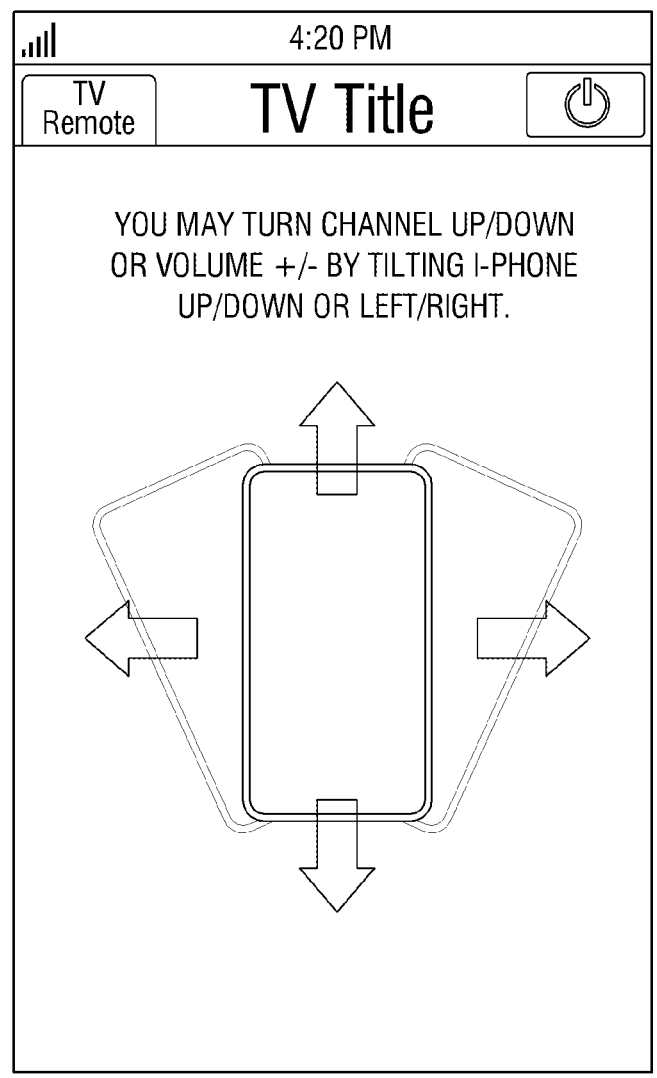
Figure 8C:
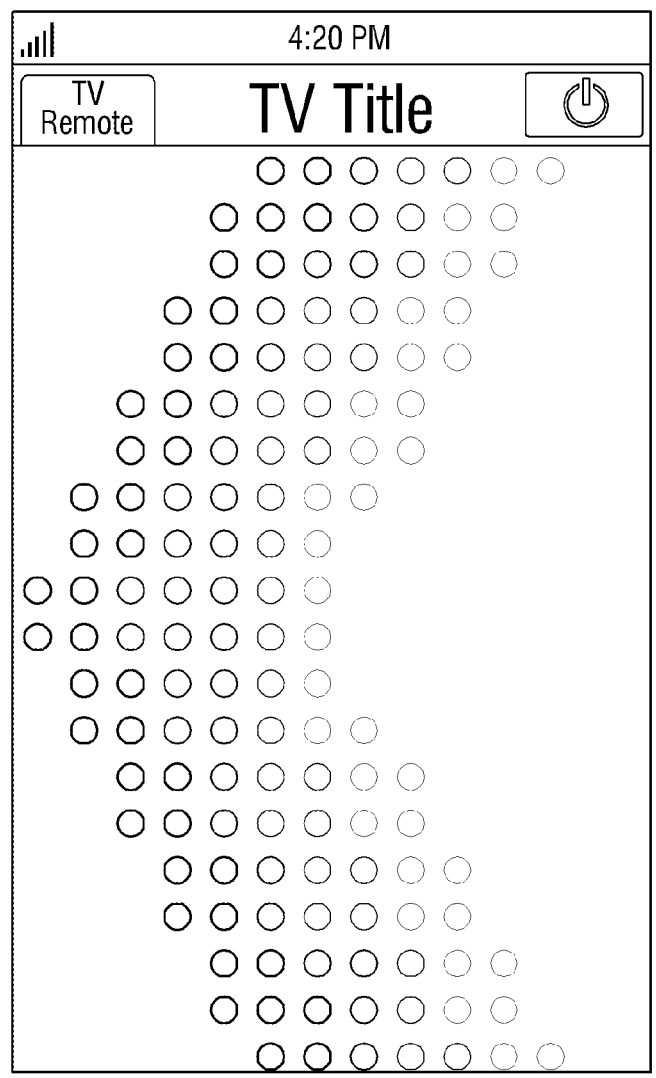

FIGS. 8A to 8C are views illustrating a user interface screen which is provided when a specific menu is selected according to an exemplary embodiment.

As illustrated in FIG. 8A, if there is a predetermined event such as a touch event, the user terminal apparatus 200 may perform the function of "Gesture Remote" illustrated in FIG. 5E.

In this case, as illustrated in FIG. 8B, up/down of channel or volume of the user terminal apparatus may be adjusted by tilting the user terminal apparatus up and down or right and left.

FIG. 8C illustrates a user interface screen during the adjustment in FIG. 8B.

Figure 9A:
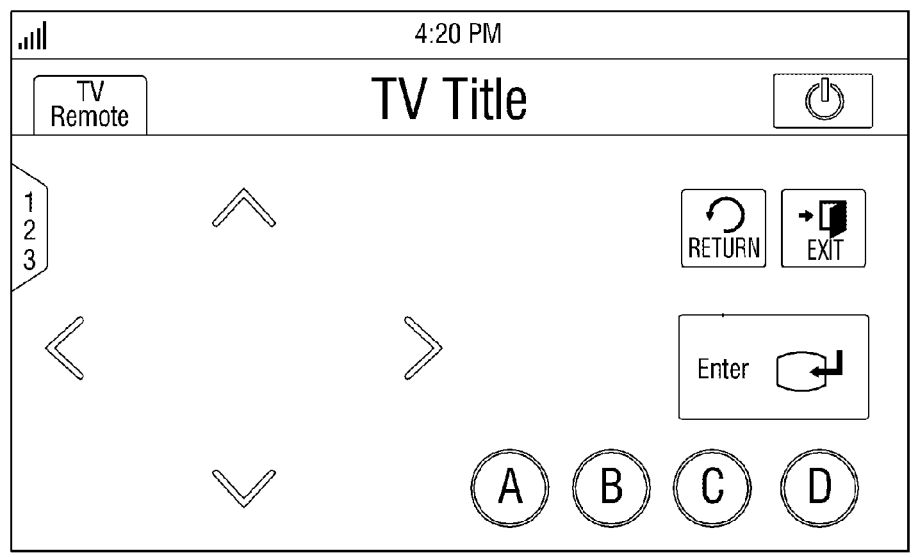
Figure 9B:
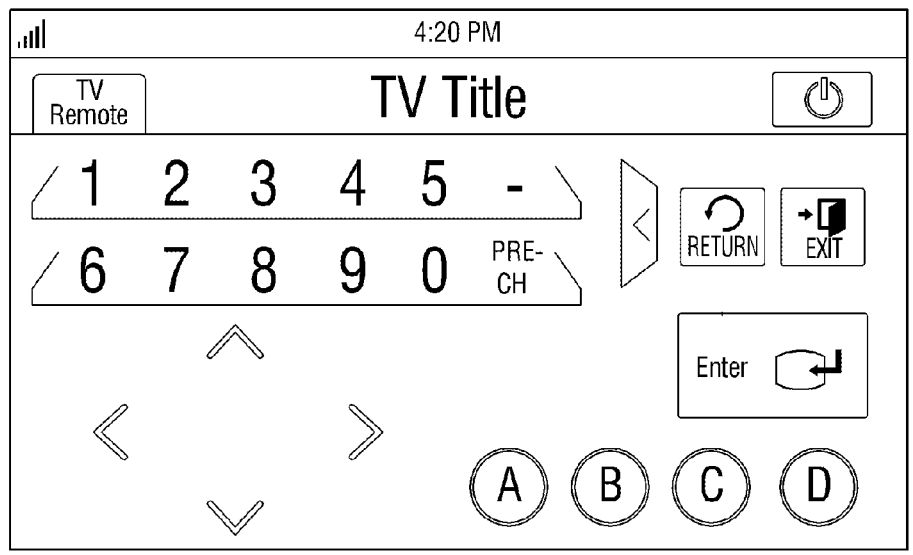

FIGS. 9A and 9B illustrate user interface screens providing a game mode ("Game Remote" menu illustrated in FIG. 5E) according to an exemplary embodiment.

Figure 10A:
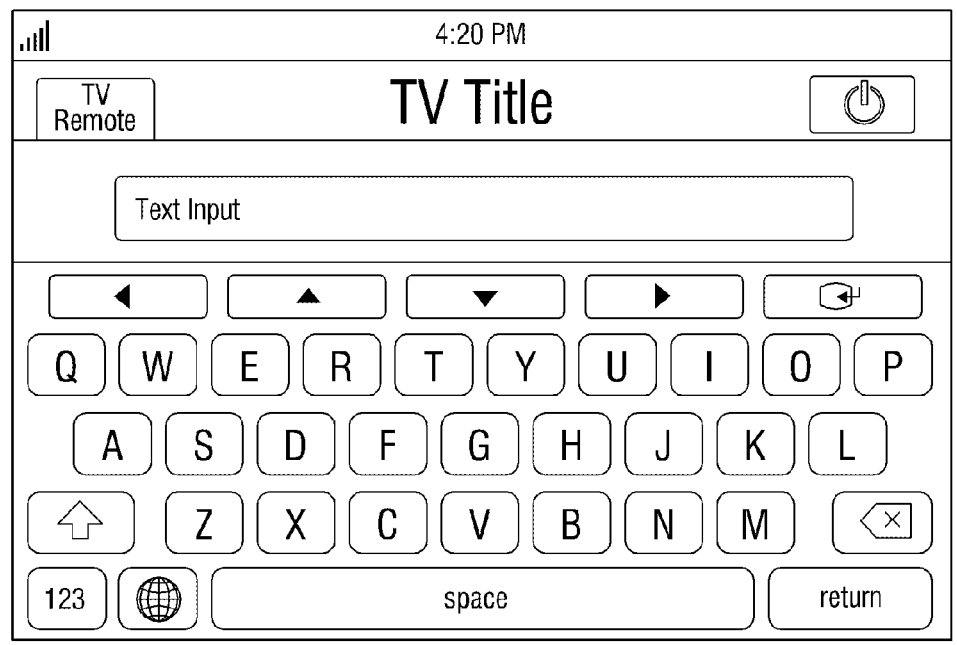
Figure 10B:
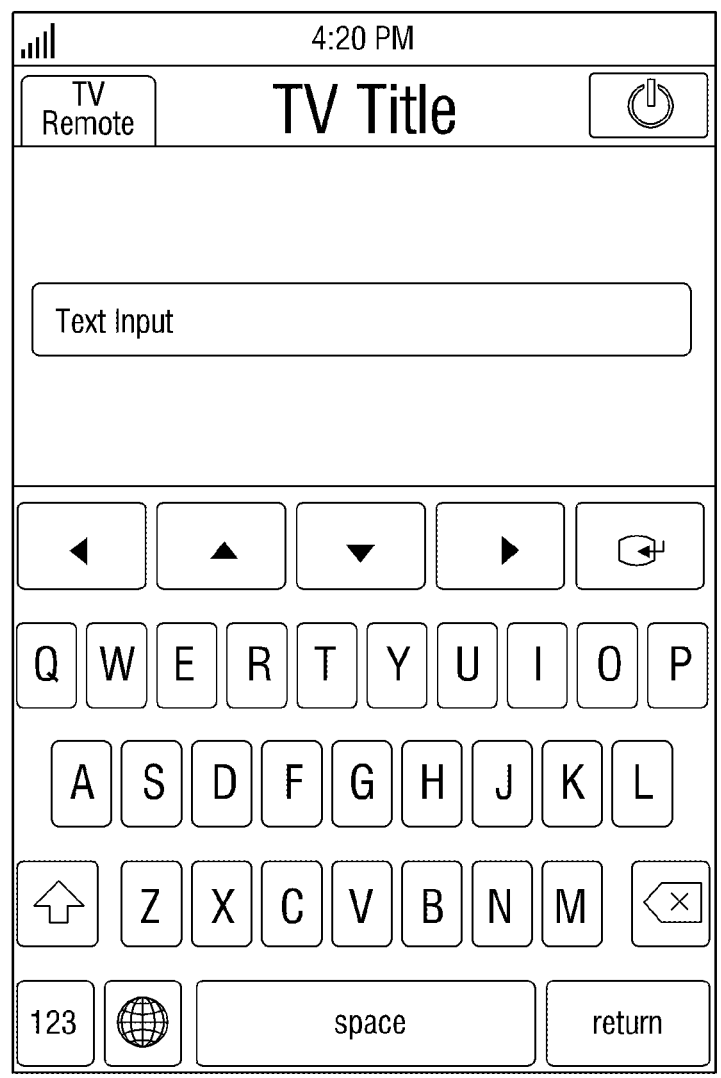

FIGS. 10A and 10B illustrate user interface screens providing a text input mode ("Keyboard" menu illustrated in FIG. 5E) according to an exemplary embodiment.

Figure 11A:
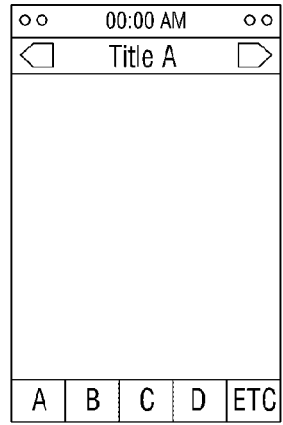
FIGS. 11A and 11B are views illustrating an example of UI data information according to various exemplary embodiments.
Figure 11B:
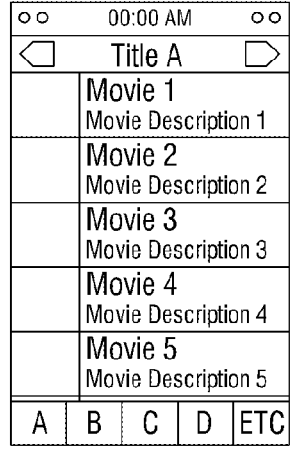

FIGS. 11A and 11B are views illustrating an example of UI data information according to various exemplary embodiments.

As illustrated in FIGS. 11A and 11B, UI data information generated by a display apparatus may be an XML document.

The XML data illustrated on the left side of FIG. 11A may generate a user interface screen, which has a configuration as that on the right of FIG. 11A, on the user terminal apparatus 200.

In addition, the XML data illustrated on the left of FIG. 11B may generate a user interface screen, which has a configuration as that on the right of FIG. 11B, on the user terminal apparatus 200.

FIG. 12 is a flowchart to explain a method for controlling a display apparatus according to an exemplary embodiment.

According to the display apparatus controlling method illustrated in FIG. 12, first of all, a user interface screen corresponding to at least one application is displayed (S1210).

Subsequently, UI information data corresponding to the user interface screen is generated (S1220). In this case, the operation of generating information (S1220) may be performed in a corresponding application program.

The UI information data is transmitted to an external apparatus upon a request from the external apparatus (S1230). In this case, the UI information data may be generated in the form of an XML document.

If UI information data is received from an external apparatus, a control operation corresponding to the received UI information data may be performed. Specifically, availability of received UI information data may be checked and then transmitted to a corresponding block (for example, a corresponding application), and the corresponding block may perform an appropriate function operation by analyzing the received UI information data. In addition, if necessary, a GUI may be generated.

Figure 13:
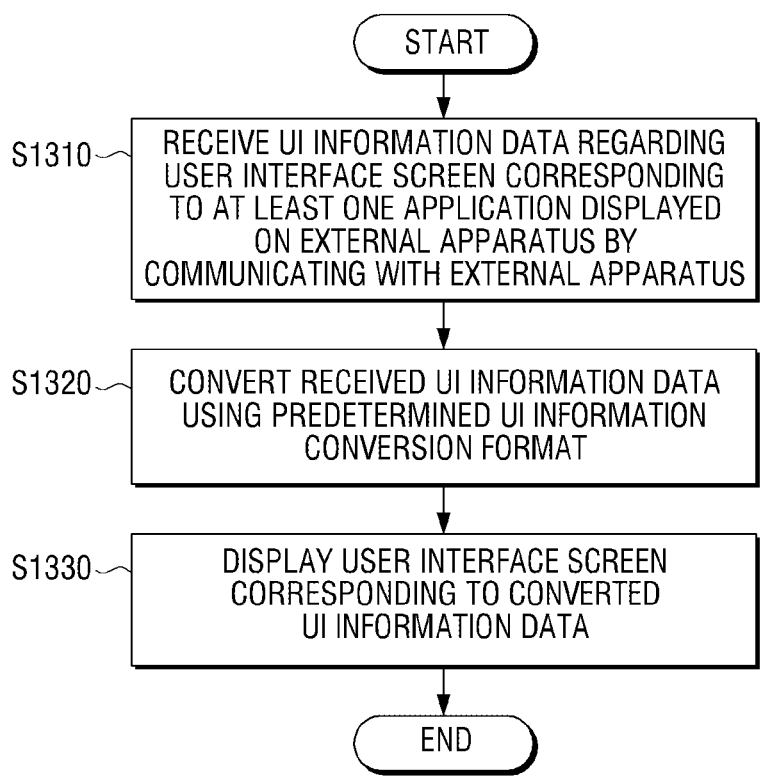
FIG. 13 is a flowchart to explain a method for providing a UI of a user terminal apparatus according to an exemplary embodiment.

FIG. 13 is a flowchart to explain a method for providing a UI of a user terminal apparatus according to an exemplary embodiment.

According to the method for providing a UI of a user terminal apparatus illustrated in FIG. 13, UI information data regarding a user interface screen corresponding to at least one application displayed on an external apparatus is received in communication with the external apparatus (S1310).

Subsequently, the received UI information data is converted using a predetermined UI information conversion format (S1320).

Subsequently, a user interface screen corresponding to the converted UI information data is displayed on a screen (S1330).

In addition, if a user command is input, a remote controller application may be executed in accordance with the input user command, a connectable external apparatus may be searched, and an icon corresponding to at least one searched external apparatus may be displayed.

UI information data may be received from an external apparatus corresponding to a selected icon from among icons corresponding to the external apparatus If there is a predetermined event or a user command, UI information data corresponding to the predetermined event may be converted using a predetermined UI information conversion format and transmitted to an external apparatus.

If there is a movement of a user terminal apparatus after a predetermined event occurs, an operation state of an external apparatus may be controlled according to the degree of the sensed movement.

In this case, a display screen may be embodied as a touch screen, and the predetermined event may be a touch event by a user.

In the exemplary embodiment, a computer-readable-recording-medium including a program for executing the above-described method for controlling a display apparatus and a method for providing a UI of a user terminal apparatus may be included. The recording medium readable by a computer includes all kinds of recording media where data readable by a computer system is stored. The recording medium readable by a computer includes ROM, RAM, CD-ROM, magnetic tape, floppy disk, optical data storage apparatus, and etc. Meanwhile, the recording medium readable by a computer may be distributed in a computer system connected via a network, and may store and execute a code readable by a computer using a distribution method.

According to the exemplary embodiment described above, an application may be easily manipulated and a content navigation may be easily performed in a display apparatus though a remote controller function.

Although a few exemplary embodiments have been shown and described, it would be appreciated by those skilled in the art that changes may be made to the exemplary embodiments without departing from the principles and spirit of the inventive concept, the scope of which is defined in the claims and their equivalents.

What is claimed is:

1. An apparatus, including at least one hardware processor, for controlling a television apparatus comprising:
a memory configured to store a remote control application for controlling the television apparatus;
a display; and
a controller, implemented in the hardware processor, and configured to display on the display an icon corresponding to the remote control application, to execute the remote control application in response to selecting the icon, to display on the display a list including at least one broadcasting signal display apparatus, including the television apparatus, which is connected to an access point in response to the execution of the remote control application, to display on the display a menu screen for controlling the television apparatus in response to selecting the television apparatus among the at least one broadcasting signal display apparatus, wherein the menu screen comprises a user interface (UI) for controlling a channel of the television apparatus and a UI for displaying, on the display, an application list including a plurality of application icons, which are corresponding to a plurality of application programs, respectively, provided by the television apparatus, and wherein, in response to selection of an application icon among the plurality of application icons, the controller controls to transmit a signal, corresponding to the application icon selected among the plurality of application icons, to the television apparatus so that an application corresponding to the selected application icon is executed on the selected television apparatus.

2. The apparatus for controlling a television apparatus as claimed in claim 1, wherein the menu screen selectively comprises a screen for executing channel up/down and a screen for inputting a channel number based on a received user command.

3. The apparatus for controlling a television apparatus as claimed in claim 1, wherein the controller, in response to the application being selected from the application list, displays a list of contents related to the selected application through the display, and in response to a content being selected from the content list, displays a screen for controlling the selected content to be displayed through the display.

4. The apparatus for controlling a television apparatus as claimed in claim 1, wherein, the controller, in response to the application being selected from the application list, displays a list of contents related to the selected application through the display, and in response to a content being selected from the content list, displays a screen for controlling the television apparatus to display the selected content through the display.

5. The apparatus for controlling a television apparatus as claimed in claim 1, wherein a communication interface of the apparatus receives UI information regarding a UI screen corresponding to the plurality of application programs provided by the television apparatus from the television apparatus, and wherein the controller converts the received UI information using a predetermined UI information conversion format and generates the menu screen based on the converted UI information.

6. The apparatus for controlling a television apparatus as claimed in claim 5, wherein the controller if there is a predetermined event, converts UI information corresponding to the predetermined event using a predetermined UI information conversion format and transmits the converted UI information to the television apparatus.

7. The apparatus for controlling a television apparatus as claimed in claim 5, further comprising:

a movement sensor, within at least one of said at least one processor, which senses a movement of the apparatus for controlling the television apparatus, wherein the controller which, if there is a movement of the apparatus for controlling the television apparatus after a predetermined event occurs, controls an operation state of the television apparatus in accordance with a degree of a movement sensed by the movement sensor.

8. The apparatus for controlling a television apparatus as claimed in claim 7, wherein the display comprises as a touch screen, and wherein the predetermined event is a touch event by a user.

9. The apparatus for controlling a television apparatus as claimed in claim 1, further comprising:

an application driver, within at least one of said at least one processor, which drives and executes the plurality of application programs provided by the television apparatus.

10. The apparatus for controlling a television apparatus as claimed in claim 9, wherein the plurality of application programs provided by the television apparatus are self-executable application programs and include multimedia content.

11. A method of controlling an apparatus for controlling a television apparatus, the method comprising:

controlling the apparatus to communicate with an access point, storing a remote control application for controlling the television apparatus in a memory of the apparatus;

displaying on a display of the apparatus an icon corresponding to the remote control application;

executing the remote control application in response to selecting the icon;

displaying on the display a list including at least one broadcasting signal display apparatus, including the television apparatus, which is connected to the access point in response to the execution of the remote control application; and displaying on the display a menu screen for controlling the television apparatus in response to selecting the television apparatus among the at least one broadcasting signal display apparatus, wherein the menu screen comprises a user interface (UI) for controlling a channel of the television apparatus and a UI for displaying, on the display, an application list including a plurality of application icons, which are corresponding to a plurality of application programs, respectively, provided by the television apparatus, and wherein the method further comprises:

in response to selection of an application icon among the plurality of application icons, transmitting a signal, corresponding to the application icon selected among the plurality of application icons, to the television apparatus so that an application corresponding to the selected application icon is executed on the television apparatus.

12. The method of controlling an apparatus for controlling a television apparatus as claimed in claim 11, wherein the menu screen selectively comprises a screen for executing channel up/down and a screen for inputting a channel number based on a received user command.

13. The method of controlling an apparatus for controlling a television apparatus as claimed in claim 11, wherein the displaying of the menu screen comprises, in response to the application being selected from the application list, displaying a list of contents related to the selected application through the display and, in response to a content being selected from the content list, displaying a screen for controlling the selected content to be displayed through the display.

14. The method of controlling an apparatus for controlling a television apparatus as claimed in claim 11, wherein the displaying of the menu screen comprises, in response to the application being selected from the application list, displaying a list of contents related to the selected one application, and, in response to a content being selected from the content list, displaying a screen for controlling the television apparatus to display the selected content.

15. The method of controlling an apparatus for controlling a television apparatus as claimed in claim 11, the method further comprising:

receiving user UI information regarding a UI screen corresponding to a plurality of applications provided by the television apparatus from the television apparatus, wherein the displaying of the menu screen comprises converting the received UI information using a predetermined UI information conversion format and generating the menu screen based on the converted UI information.

16. The method of controlling an apparatus for controlling a television apparatus as claimed in claim 15, further comprising:
if there is a predetermined event, converting UI information corresponding to the predetermined event using a predetermined UI information conversion format and transmitting the converted UI information to the television apparatus.

17. The method of controlling an apparatus for controlling a television apparatus as claimed in claim 15, further comprising:
sensing a movement of the apparatus for controlling the television apparatus; and
if there is a movement of the apparatus for controlling the television apparatus after a predetermined event occurs, controlling an operation state of the television apparatus in accordance with a degree of a movement sensed by a movement sensor.

18. The method of controlling an apparatus for controlling a television apparatus as claimed in claim 17, wherein the predetermined event is a touch event by a user.

19. The method of controlling an apparatus for controlling a television apparatus as claimed in claim 11, further comprising:
driving and executing the plurality of application programs provided by the television apparatus.

20. A television apparatus, including at least one hardware processor, comprising:
a memory configured to store a plurality of applications which are executable application programs; and
a controller implemented in the hardware processor, and configured, in response to a signal received from a remote control application executed in an external apparatus which establishes a communication with the television apparatus, to change a channel which is viewed in the television apparatus, and to provide information about the plurality of applications to the external apparatus if a signal received from the executed remote control application is for requesting the information about the plurality of applications so that the information about the plurality of applications is displayed on the remote control application executed in the external apparatus, and, in response to receiving a signal including identification information about an application from the executed remote control application, to execute the application among the plurality of applications.

21. The television apparatus as claimed in claim 20, wherein the controller provides information about a plurality of contents related to the selected application from among the plurality of application, and displays one of the plurality of contents.

22. A non-transitory computer readable medium where a remote control application which controls a television apparatus using an apparatus is stored,
wherein the remote control application performs a method comprising:
displaying, on a display of the apparatus in which the remote control application is executed, a list including at least one broadcasting signal display apparatus, including the television apparatus, which is connected to an access point in response to the execution of the remote control application; and
displaying on the display a menu screen for controlling the television apparatus in response to selecting the television apparatus among the at least one broadcasting signal display apparatus,
wherein the menu screen comprises a user interface (UI) for controlling a channel of the television apparatus and a UI for displaying, on the display, an application list including a plurality of application icons, which are corresponding to a plurality of application programs, respectively, provided by the television apparatus, and
wherein the method further comprises:
in response to selection of an application icon among the plurality of application icons, transmitting a signal, corresponding to the application icon selected among the plurality of application icons, to the television apparatus so that an application corresponding to the selected application icon is executed on the television apparatus.

* * * * *